United States Patent [19]

Fluhr et al.

[11] Patent Number: 4,754,256
[45] Date of Patent: Jun. 28, 1988

[54] AUDIBLE AUTO TURN SIGNAL

[76] Inventors: Robert E. Fluhr, 45 Forest Dale Rd., Kinnelon, N.J. 07405; George Spector, 233 Broadway Rm. 3815, New York, N.Y. 10007

[21] Appl. No.: 936,072
[22] Filed: Nov. 28, 1986
[51] Int. Cl.⁴ .............................................. B60Q 1/34
[52] U.S. Cl. .................................. 340/75; 340/52 D; 340/88; 439/174
[58] Field of Search ................ 340/75, 88, 52 D, 326; 439/174, 175

[56] References Cited

U.S. PATENT DOCUMENTS 2,896,190  7/1959  Gallaro et al. ........................ 340/75
3,343,123  9/1967  Troesch ................................ 340/75
3,806,868  4/1974  Portman ........................... 340/75 X

FOREIGN PATENT DOCUMENTS 0104279  4/1984  European Pat. Off. ............ 439/175

Primary Examiner—Joseph A. Orsino
Assistant Examiner—Brian R. Tumm

[57] ABSTRACT

An audible automotive turn signal device is provided and consists of a flasher unit having a female socket mating with a male plug which is electrically connected to an audible turn indicator and lamps of the system. In a modification an adjustable feature is built into the male plug so as to extend the blades for better contact with the female socket in the flasher unit.

2 Claims, 1 Drawing Sheet

U.S. Patent  Jun. 28, 1988  4,754,256
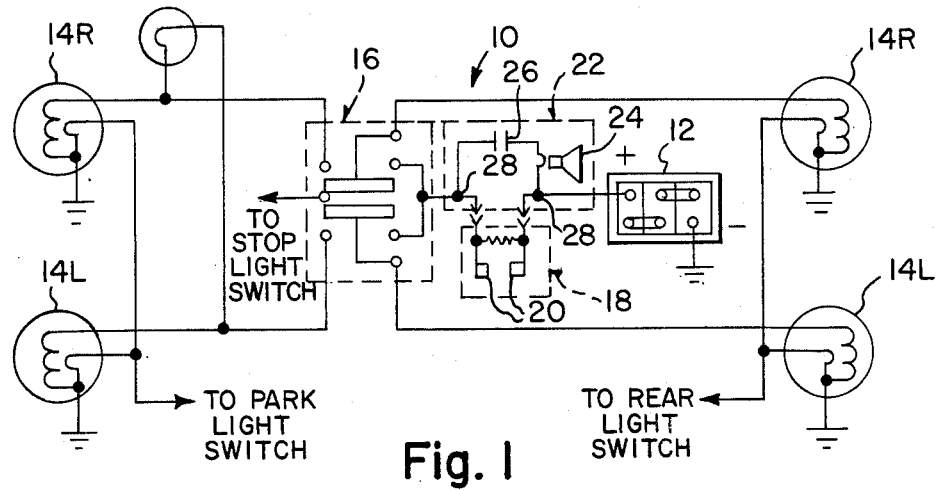
Fig. 1
PRIOR ART
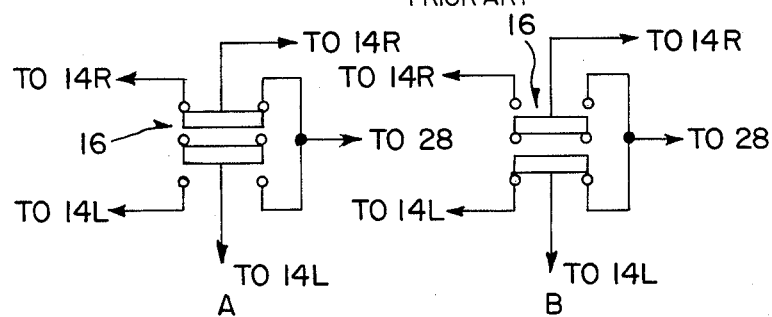
Fig. 2
PRIOR ART
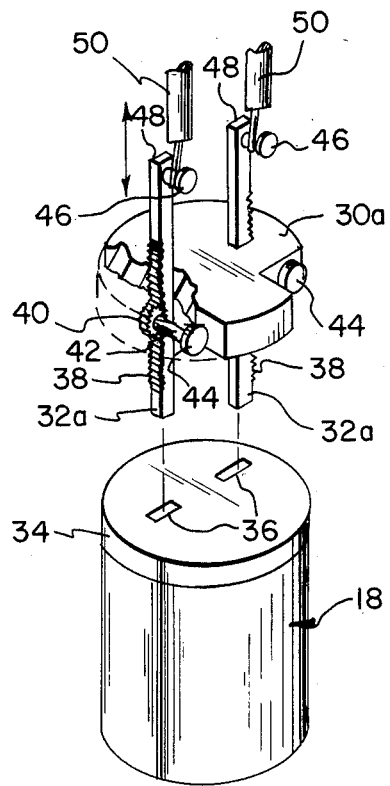
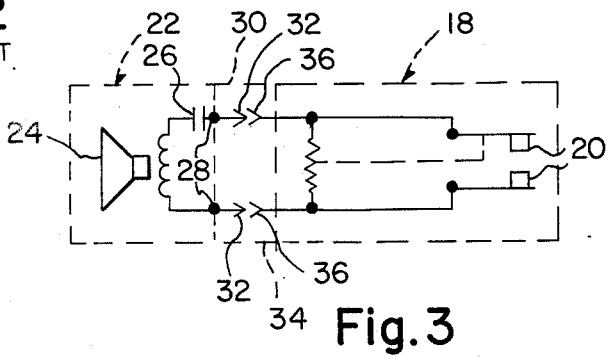
Fig. 3
Fig. 4

AUDIBLE AUTO TURN SIGNAL

BACKGROUND OF THE INVENTION

The instant invention relates generally to directional turn signals for motor vehicles and more specifically to an audible automotive turn signal device.

Numerous directional turn signals for motor vehicles have been provided in the prior art that are adapted to sound audible signals for alerting the drivers of the motor vehicles. For example, U.S. Pat. Nos. 3,806,868 and 4,196,415 all are illustrative of such prior art. While these units may be suitable for the particular purpose to which they address, they would not be as suitable for the purposes of the present invention as heretofore described.

SUMMARY OF THE INVENTION

A primary object of the present invention is to provide an audible automotive turn signal device that will overcome the shortcomings of the prior art devices.

Another object is to provide an audible automotive turn signal device that includes a flasher unit having a female socket mating with a male plug which is electrically connected to an audible turn indicator and lamps of the system.

An additional object is to provide an audible automotive turn signal device that includes an adjustable feature built into the male plug so as to extend the blades for better contact with the female socket in the flasher unit.

A further object is to provide an audible automotive turn signal device that is simple and easy to use.

A still further object is to provide an audible automotive turn signal device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a schematic diagram of a typical turn signal system with the invention therein.

FIG. 2 shows in schematic form the partial connections of items in FIG. 1 illustrating the left-right switching operations of the turn indicator switch.

FIG. 3 is a schematic circuit showing the plug of the audible turn indicator plugged into the flasher unit socket.

FIG. 4 is a partly exploded perspective view of a modification of the invention with parts broken away showing its adjustment features of the plug.

DETAILED DESCRIPTION OF THE DRAWING FIGURES

Turning now descriptively to the drawings, in which similar reference characters denote similar elements throughout the several views, FIG. 1 illustrates an audible automatic turn signal device 10 of the type having a battery 12, indicator lamps 14R, 14L, a turn indicator switch device 16, an automotive turn indicator flasher unit 18 that has a pair of contacts 20 intermittently opened and closed during a turn indication operation of the switch device 16 to intermittently flash the indicator lamps 14 on and off during the operation of the flasher unit 18 and an audible turn indicator 22 that has a loud speaker 24 in series connection to a capacitor 26. The audible turn indicator 22 has a pair of terminals 28 connected to the contacts 20 in the flasher unit 18, the battery 12 and the indicator lamps 14 via the switch device 16. During each intermittent opening and closing of the contacts 20 in the flasher unit 18 the consequent charge and discharge of the capacitor 26 will result in audible clicks in the loud speaker 24.

FIG. 2A shows the switch device 16 in a first position to operate the indicator lamps 14R on the right side of the motor vehicle. FIG. 2B shows the switch device in a second position to operate the indicator lamps 14L on the left side of the motor vehicle.

The invention is best seen schematically in FIG. 3 and consists of a plug 30 that has a pair of blades 32. The blades are electrically connected to the terminals 28 of the audible turn indicator 22. A socket 34 is built into the flasher unit 18 and has a pair of slots 36 electrically connected to the contacts 20 in the flasher unit. When the blades 32 of the plug 30 are pushed into the slots 36 of the socket 34 an electrical connection is quickly made between the audible turn indicator 22 and the flasher unit 18.

FIG. 4 shows a plug 30a that has adjustable blades 32a for making better contact with the slots 36 in the socket 34 in the flasher unit 18. Each of the blades 32a is an elongated conductive rack member 38 extending through the plug 30a. A pair of insulated pinions 40 are provided, each having a shaft 42 and a turn knob 44. Each of the pinions 40 is engageable with each of the rack members 38 so that when the turn knobs 44 are rotated the rack members 38 will move down for making better contact with the slots 36 in the socket 34 in the flasher unit 18. Screws 46 as shown are threaded into each end 48 of each of the rack members 38 to act as terminals for the plug 30a for connection to wires 50 extending from the terminals 28 of the audible turn indicator 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An audible automatic turn signal device for the type having a battery, indicator lamps, a turn indicator switch device, an automotive turn indicator flasher unit having a pair of contacts intermittently opened and closed during a turn indication operation of the switch device to intermittently flash the indicator lamps on and off during the operation of the flasher unit and an audible turn indicator having a loudspeaker in series connection to a capacitor and a pair of terminals connected to the contacts in the flasher unit, the battery and the indicator lamps via the switch device, whereby during each intermittent opening and closing of the contacts in the flasher unit the consequent charge and discharge of the capacitor will result in audible clicks in the loudspeaker, wherein the improvement comprises:

(a) a plug having a pair of blades, said blades electrically connected to the terminals of the audible turn indicator; and (b) a socket built into the flasher unit, said socket having a pair of slots electrically connected to the contacts in the flasher unit so that when said blades of said plug are pushed into said socket an electrical connection is quickly made between the audible turn indicator and the flasher unit, further comprising means for adjusting said blades of said plug for making better contact with said slots in said socket in the flasher unit, wherein said adjusting means includes:

(c) each of said blades being an elongated conductive rack member extending through said plug; and (d) a pair of insulated pinions each having a shaft and turn knob, each of said pinions engageable with each of said rack members so that when said turn knobs are rotated said rack members will move down for making better contact with said slots in said socket in the flasher unit.

2. An audible automatic turn signal device as recited in claim 1, further comprising a pair of screws, each of said screws threaded into each end of each of said rack members to act as a terminal for said plug for connection to wires extending from the terminals of the audible turn indicator.

* * * * *